US012681500B1

(12) United States Patent
Chang et al.

(10) Patent No.: US 12,681,500 B1
(45) Date of Patent: Jul. 14, 2026

(54) TRAJECTORY DETERMINATION INCORPORATING REMOTE OPERATIONS

(71) Applicant: Zoox, Inc., Foster City, CA (US)

(72) Inventors: Yan Chang, Sunnyvale, CA (US); Alec Jacob Farid, Commack, NY (US); Jeffrey Loris Irion, Castro Valley, CA (US); Sutej Pramod Kulgod, Foster City, CA (US); Ruikun Yu, San Jose, CA (US)

( * ) Notice: Subject to any disclaimer, the term of this patent is extended or adjusted under 35 U.S.C. 154(b) by 248 days.

(21) Appl. No.: 18/395,350

(22) Filed: Dec. 22, 2023

(51) Int. Cl.
| | |
|---|---|
| *G05D 1/646* | (2024.01) |
| *G05D 1/222* | (2024.01) |
| *G05D 109/10* | (2024.01) |
| *G06N 3/044* | (2023.01) |
| *G06N 3/0464* | (2023.01) |
| *G06N 20/20* | (2019.01) |

(52) U.S. Cl.
CPC ............. *G05D 1/646* (2024.01); *G05D 1/222* (2024.01); *G06N 3/044* (2023.01); *G06N 3/0464* (2023.01); *G06N 20/20* (2019.01); *G05D 2109/10* (2024.01)

(58) Field of Classification Search
None
See application file for complete search history.

(56) References Cited

U.S. PATENT DOCUMENTS

| | | | | |
|---|---|---|---|---|
| 2020/0298891 | A1* | 9/2020 | Liang | G06V 20/58 |
| 2022/0065644 | A1* | 3/2022 | Kundu | G01C 21/3446 |
| 2022/0326714 | A1* | 10/2022 | Goyal | B60W 60/0027 |
| 2022/0357738 | A1* | 11/2022 | Adachi | B60W 60/001 |
| 2023/0044920 | A1* | 2/2023 | Watanabe | B60W 60/0015 |
| 2023/0202521 | A1* | 6/2023 | Krishnamoorthy | |
| | | | | B60W 60/0015 |
| | | | | 701/24 |
| 2023/0242142 | A1* | 8/2023 | Zhang | B60W 60/001 |
| | | | | 701/23 |
| 2024/0126254 | A1* | 4/2024 | Sridharan | G05D 1/2246 |
| 2024/0182082 | A1* | 6/2024 | Chen | B60W 60/0011 |
| 2024/0300525 | A1* | 9/2024 | Bagnell | G06N 3/09 |
| 2024/0414337 | A1* | 12/2024 | Kundu | H04N 19/12 |

* cited by examiner

*Primary Examiner* — Amelia Vorce
(74) *Attorney, Agent, or Firm* — Lee & Hayes, P.C.

(57) ABSTRACT

A cost associated with a candidate trajectory can be determined based on whether a vehicle has received a teleoperation command at a time associated with the cost evaluation. In some cases, an example system is configured to determine the cost for a candidate trajectory based on at least one of: (i) context data representing a current state of an environment of a vehicle at a current time, (ii) object historical data representing a behavior of an object in the environment during a period before the current time, (iii) vehicle historical data representing a behavior of the vehicle in the environment during the period before the current time, (iv) prediction data comprising one or more of a predicted vehicle state or a predicted object state at a future time associated with the candidate trajectory, or (v) teleoperation data representing a feature of a teleoperation command received by the vehicle.

20 Claims, 6 Drawing Sheets

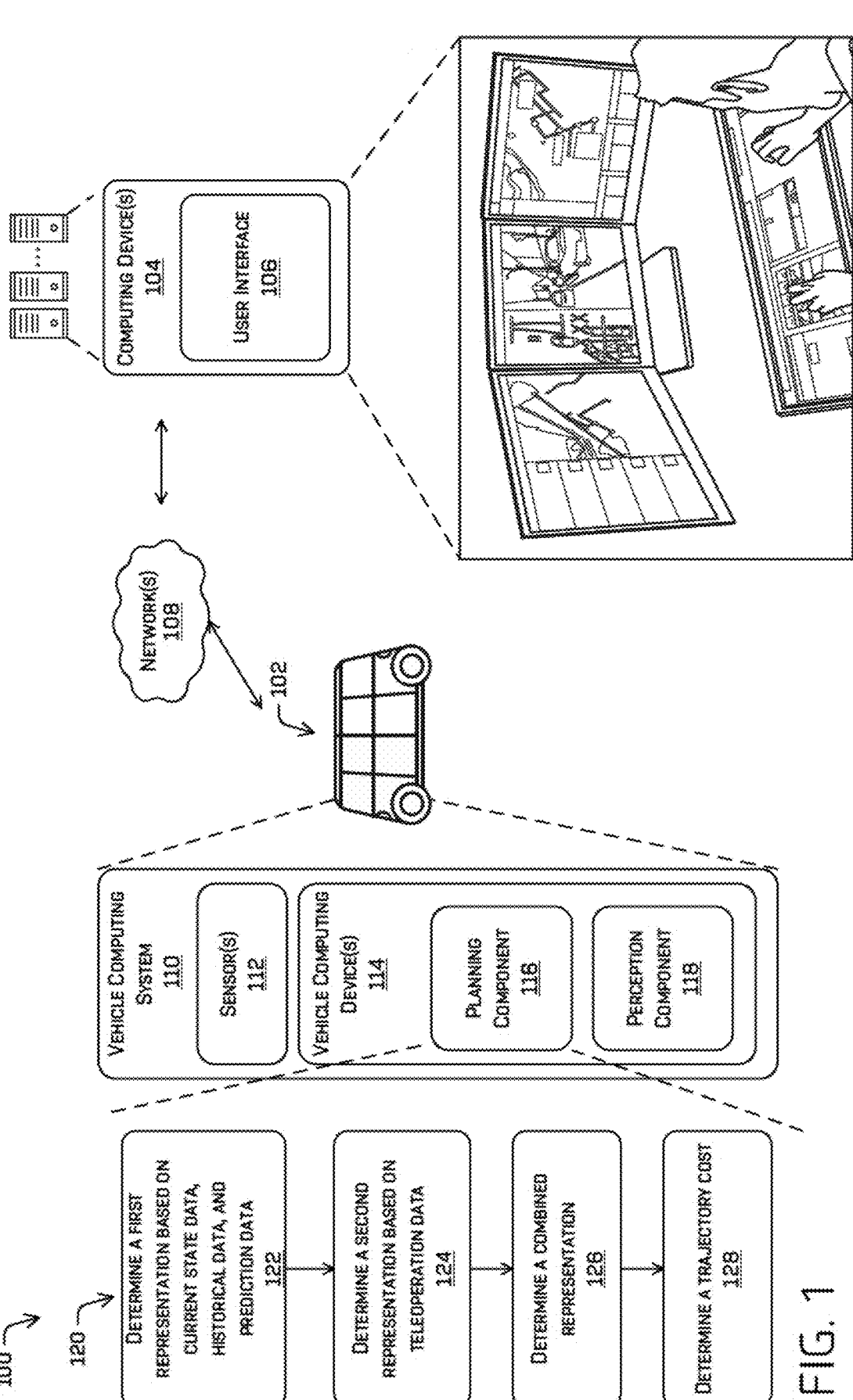

COMPUTING DEVICE(S) 104

USER INTERFACE 106

NETWORK(S) 108

102

VEHICLE COMPUTING SYSTEM 110

SENSOR(S) 112

VEHICLE COMPUTING DEVICE(S) 114

PLANNING COMPONENT 116

PERCEPTION COMPONENT 118

100

120

DETERMINE A FIRST REPRESENTATION BASED ON CURRENT STATE DATA, HISTORICAL DATA, AND PREDICTION DATA 122

DETERMINE A SECOND REPRESENTATION BASED ON TELEOPERATION DATA 124

DETERMINE A COMBINED REPRESENTATION 126

DETERMINE A TRAJECTORY COST 128

RECEIVE CONTEXT DATA, HISTORICAL DATA, AND PREDICTION DATA
402

DETERMINE A FIRST REPRESENTATION
404

TELEOPERATION COMMAND?
406

No

YES

DETERMINE A SECOND REPRESENTATION USING A TRAINED ML MODEL
410

DETERMINE DEFAULT SECOND REPRESENTATION
408

DETERMINE A COMBINED REPRESENTATION
412

DETERMINE A TRAJECTORY COST
414

500

RECEIVE A FIRST
REPRESENTATION
502

RECEIVE A SECOND
REPRESENTATION BASED ON
TELEOPERATION DATA
504

DETERMINE A COMBINED REPRESENTATION
506

DETERMINE A
FIRST COST
MEASURE
508A

DETERMINE A
SECOND COST
MEASURE
508B

DETERMINE AN
NTH COST
MEASURE
508N

DETERMINE AN OVERALL COST MEASURE
510

PERFORM TREE SEARCH
512

CONTROL THE VEHICLE
514

TRAJECTORY DETERMINATION INCORPORATING REMOTE OPERATIONS

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. In some situations, remote operations may be used to control the vehicle. However, determinations of trajectories without accounting for the possibility of such remote operations may not result in optimal trajectory generation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates a schematic diagram of an environment with an example vehicle in communication with a remote operator, according to at least one example.

DETAILED DESCRIPTION

Figure 2:
FIG. 2 provides an operational example of a tree structure that may be used to perform trajectory planning for a vehicle.

Techniques for determining a cost associated with a candidate trajectory based on whether a vehicle has received a teleoperation command are described herein. In some cases, an example system is configured to determine the cost for a candidate trajectory based on at least one of: (i) context data representing a current state of an environment of a vehicle at a current time, (ii) object historical data representing a behavior of an object in the environment during a period before the current time, (iii) vehicle historical data representing a behavior of the vehicle in the environment during the period before the current time, (iv) prediction data comprising one or more of a predicted vehicle state or a predicted object state at a future time associated with the candidate trajectory, or (v) teleoperation data representing whether the vehicle has received a teleoperation command at a corresponding (e.g., at the current time) and/or a feature of a teleoperation command received by the vehicle at the corresponding time. Accordingly, the techniques discussed herein may improve the safety of occupants of an autonomous vehicle that incorporates the techniques discussed herein. Moreover, the techniques may improve the efficiency of vehicles, such as an autonomous vehicle, in accomplishing a mission such as, for example, delivering passengers and/or cargo, surveying a region, or the like. While various implementations describe herein describe that teleoperation command is associated with a current time, a person of ordinary skill in the relevant technology will recognize that the time associated with the teleoperation command may deviate from the current time (e.g., the teleoperation command may be integrated into cost evaluation with some delay, the teleoperation command may be associated with a predicted future time, and/or the like).

For example, in some cases, an example system may determine a cost associated with a candidate trajectory at a current time by generating a tree structure (e.g., a decision tree), where a first subset of the nodes associated with the tree structure represent environment states (e.g., a current environment state and a set of predicted environment states) and a second subset of the nodes associated with the tree structure represent vehicle actions (e.g., actions currently available to the vehicle and actions predicted to be available to the vehicle at the predicted environment states). For example, an edge between a state node and an action node may represent that the action associated with the action node is determined to (e.g., predicted to) be available to the vehicle at the state associated with the environment state. In some cases, a candidate trajectory may be associated with a trace of the tree structure from the root node to another node. For example, the candidate trajectory may be associated with the sequence of states and/or the sequence of actions associated with the trace. In some cases, a cost associated with the candidate trajectory may be determined based on: (i) context data representing a state of the environment at the root node (e.g., at the current time), (ii) historical data representing a previous behavior of the vehicle and/or an object in the environment at the root node (e.g., during a period before the current time), (iii) prediction data representing one or more states (e.g., one or more vehicle states and/or one or more object states) and/or one or more actions associated with the nodes of the tree structure that are associated with the trace, and (iv) teleoperation data representing whether the vehicle has received a teleoperation command at the current time associated with the root node and/or a feature of a teleoperation command received by the vehicle at the current time associated with the root node.

In some cases, given a candidate trajectory that is associated with a trace of the tree structure, an example system may: (i) determine a first representation based on a state of the vehicle's environment at a current time associated with the root node of the, (ii) determine a second representation based on a behavior of the vehicle and/or an object in the environment at a period before the current time, (iii) determine a third representation based on predicted state(s) and/or action(s) associated with the trace, (iv) combine (e.g., concatenate, aggregate, average, and/or the like) the three representations to generate a fourth representation, (v) determine a fifth representation based on whether the vehicle has received a teleoperation command at the current time and/or a feature of the teleoperation command at the current time, (vi) combine (e.g., concatenate, aggregate, average, and/or the like) the fourth representation and the fifth representation to generate a sixth representation, (vii) process the sixth representation using N portions (e.g., N heads) of a machine-learned model to generate N cost measures associated with the candidate trajectory, and/or (viii) determine the candidate trajectory's overall cost based on the N cost measures. The N cost measures may be associated with N cost categories. The overall estimated cost associated with an estimated trace of the tree structure may be used to determine whether to expand a node associated with the tree as the tree is expanded. For example, in some cases, in a layer of the tree structure (e.g., in an intermediate layer of the tree structure), a subset of the layer's nodes selected based on the computed costs are expanded which may include, for example, those costs determined based at least in part on the remote operator input as described in detail herein. Example techniques for selective expansion of a tree structure based on costs (e.g., machine-learned costs) are described in U.S. patent application Ser. No. 18/394,408, entitled "Trajectory Planning Based on Tree Search Expansion" and filed on Dec. 22, 2023, which is incorporated by reference in entirety and for all purposes.

In some cases, the techniques described herein relate to a tree structure (e.g., a decision tree structure) with two types of nodes: state nodes and action nodes. An edge from a state node to an action node may represent that an action associated with the action node is performed (e.g., by a vehicle) while the environment of a vehicle corresponds to a state associated with the state node. An edge from an action node may represent that performing an action associated with the action node is predicted to result in a state associated with the state node. For example, the root node of the tree structure may represent the current state of a vehicle's environment. The root node may be connected to a set of action nodes, each corresponding to an action that may be performed by the vehicle in the current state. The action nodes may in turn be connected to predicted state nodes, each corresponding to a state of the environment that is predicted to result from performing an action. For example, the tree structure may represent that a first action may result in one of two potential predicted states (e.g., each with a computed probability of occurrence). Of course, this is one of many implementations and the disclosure is not meant to be so limiting. As an alternate or additional example, edges may be associated with actions such that a single type of node (e.g., state prediction or measurement) may be used in the tree structure.

In some cases, the tree structure may be used to model sequential decision making for a vehicle navigating a dynamic environment. The root node of the tree structure may represent the vehicle's current environmental state (e.g., as determined based on the vehicle's sensor inputs). For example, the current environmental state may represent observed positions of other vehicles, pedestrians, traffic signals, and/or the like. In some cases, the action nodes connected to the root node capture possible actions the vehicle could perform in the current state. For example, action nodes may correspond to changing lanes, turning, accelerating, braking, and/or the like. Each action node may be connected to one or more predicted state nodes that model the potential outcomes of taking that action and/or tracking to the related action from a state associated with the node. Example architectures for a tree structure are described in U.S. patent application Ser. No. 17/900,658, entitled "Trajectory Prediction Based on a Decision Tree", and filed on Aug. 31, 2022, which is incorporated by reference in entirety and for all purposes.

For example, if the vehicle is currently behind a slow lead vehicle, action nodes may correspond to maintaining current speed, braking, or changing lanes. The predicted state nodes may represent the different scenarios that may result from performing such actions. For example, a predicted state node may represent that, if the vehicle maintains current speed, the lead vehicle may remain close ahead. In some cases, the predicted state nodes resulting from a single action node may represent the uncertainty in potential outcomes. For example, predicted state nodes resulting from the action of changing lanes may represent that other vehicles in the target lane may accommodate and slow down or may fail to see the vehicle and not react. In some cases, each of those scenarios is associated with a corresponding predicted state node or nodes. In some cases, each predicted state node and/or each predicted scenario is associated with a computed probability of occurrence.

In some cases, the tree structure enables a system (e.g., the vehicle's computing device or a remote server that communicates with the vehicle) to simulate different action sequences and resulting states to generate an optimal trajectory for the validate. The tree structure may be expanded to determine predicted states in the future resulting from different sequences of actions. The predicted states may then be used to determine costs for different trajectories that are available to the vehicle. In some cases, based on those determined costs, an optimal trajectory for controlling the vehicle may be selected. In some cases, determining a trajectory for a vehicle based on simulations performed using expansions of a tree structure (e.g., a decision tree structure) may be performed using techniques that are described in U.S. patent application Ser. No. 18/084,419, entitled "Machine-Learned Cost Estimation in Tree Search Trajectory Generation for Vehicle Control" and filed on Dec. 19, 2022 and/or U.S. patent application Ser. No. 17/900,658, entitled "Trajectory Prediction Based on a Decision Tree" and filed on Aug. 31, 2022, both of which are incorporated by reference herein in their entireties and for all purposes.

In some cases, the techniques discussed herein may include a vehicle guidance system that generates a trajectory for controlling an autonomous vehicle based at least in part on a tree search technique that alternately determines a candidate action and predicts a future state of the environment, dynamic object(s), and the autonomous vehicle responsive to the candidate action. The tree search may use a cost function to determine a cost associated with a predicted state and/or candidate action. In some examples, determining the cost using the cost function may include simulating future states of dynamic object(s) and/or the environment, which may be time consuming and computationally intensive. For example, to determine a first predicted state to further explore (to assess whether candidate action(s) to get to or from that state are feasible), cost(s) associated with a series of action(s) and/or predicted state(s) before and/or after that predicted state may be determined until an endpoint is reached, such as a horizon time along a route, to determine the cost associated with that first predicted state. This portion of the tree search may represent 40% or more of the latency of the tree search. The costs associated with predicted states and/or downstream nodes may then be used to determine whether to expand those predicted states and/or downstream nodes.

The tree search discussed herein may alternately determine a candidate action to track and a predicted state of the environment associated with (e.g., at least partially responsive to) tracking to the candidate action at a future time step, another candidate action based on the predicted state of the environment, a second predicted state of the environment associated with the additional candidate action at a further future time step, and so on, up to a time horizon or a specified number of actions. A candidate action may indicate, for example, a trajectory for controlling motion of the vehicle, activating emitters of the vehicle (e.g., a turn signal, a headlight, a speaker), and/or the like. Each candidate action may be associated with a different action node and each predicted environment state may be associated with a prediction node of the tree.

As an initial operation, the tree search may determine, based at least in part on sensor data, the current state of an environment associated with the autonomous vehicle, which may include dynamic objects and/or static objects. This initial state may be associated with a root node. The root node may be a prediction node, in at least one example. The state of the environment may be indicated by a data structure associated with the root node/prediction node, in some examples. Using this initial state, the tree search may determine one or more candidate actions for exploration. A candidate action may comprise a coarse maneuver, such as "stay in same lane," "lane change left," "execute right turn," "stop," or the like; and/or fine instructions such as a curve that defines and/or is associated with a position, steering angle, steering rate, velocity, and/or acceleration for the vehicle controller to track. In some examples, determining the one or more candidate actions for exploration may comprise transmitting the initial environment state (or the state that is indicated by a particular prediction node of a branch that is being explored at predictions nodes deeper than the initial node) to the planning component of the vehicle and receiving the set of candidate actions from the planning component. The planning component may be a nominal planning component of the vehicle that generates one or more trajectories for controlling motion and/or operation of the vehicle in contrast to a contingent planning component that controls the vehicle during aberrant or emergency situations, although it is contemplated that a contingent planning component may additionally or alternatively provide generate candidate action(s) for use by the tree search. A tree search component may associate the one or more candidate actions of the set received from the planning component with action nodes. The actions may correspond to predetermined candidate trajectories available to the vehicle at a current and/or simulated future time.

In some cases, a state (e.g., the current state and/or a predicted future state) represented by a tree structure is associated with one or more state samples. A state sample may be a snapshot of an environment (e.g., a snapshot of the current environment or a snapshot of a predicted future environment) that contains sufficient data to perform a simulation with respect to the environment. For example, a first state may be associated with a first state sample that represents data (e.g., position, velocity, and/or acceleration) associated with a first object (e.g., a reactive entity, such as a vehicle), a second state sample that represents data associated with a second object (e.g., a nominal entity), and a third state sample that represents data associated with a third object (e.g., an inattentive entity).

In some cases, after and/or during the tree search, an example system determines a cost associated with a candidate trajectory that is associated with a trace within the tree structure. The cost associated with a candidate trajectory may be determined based on at least one of: (i) a state of the environment at a current time associated with the root node of the tree structure, (ii) a behavior of the vehicle and/or an object in the vehicle's environment at a period before the current time, (iii) predicted state data representing one or more predicted vehicle states and/or one or more predicted object states associated with the trace, or (iv) teleoperation data representing whether the vehicle has received a teleoperation command at a current time and/or a feature of a teleoperation command associated with the current time.

For example, the system may process a state of the environment at a current time (e.g., a top-down representation of the environment) using a first model (e.g., a convolutional neural network) to determine a first representation. The system may also process one or more past actions of the vehicle and/or an object in the environment using a second model (e.g., a recurrent neural network, such as a graph-based recurrent neural network) to determine a second representation. The system may also process one or more predicted object states and/or predicted vehicle states represented by the nodes of a trace using a third model (e.g., a graph-based neural network) to determine a third representation. The system may also process one or more actions (e.g., one or more waypoints, one or more target states, one or more target controls; and/or one or more movements) associated with a teleoperation command received in relation to the current time to determine a fourth representation. The system may then determine a cost associated with the candidate trajectory corresponding to the trace based on the first, second, third, and fourth representations. For example, the system may combine the first, second, and third representations to determine a fifth representation. The system may then combine the fourth and fifth representations to determine a combined representation. The combined representations may then be processed to determine N cost measures and/or an overall cost for the candidate trajectory that is associated with the trace.

In some cases, the techniques described herein relate to determining a cost associated with a candidate trajectory for a vehicle based on a current state of the vehicle's environment. The current state of the vehicle's environment may represent at least one of a position, an orientation, a velocity, an acceleration, and/or a jerk associated with the vehicle and/or another object in the environment. In some cases, the current state of the vehicle's environment may include a top-down representation of the environment that depicts positions of one or more dynamic objects (e.g., one or more static objects such as roadway features, one or more dynamic objects such as vehicles and/or pedestrians, and/or the like) in the environment. In some cases, the current state of the vehicle's environment is associated with a root node of a tree structure used to evaluate a candidate trajectory associated with the vehicle. In some cases, the current state of the vehicle's environment includes a state (e.g., at least one of a position, an orientation, a velocity, and/or the like) of an object (e.g., a static object such as a roadway feature, a dynamic object such as a pedestrian and/or a vehicle, and/or the like) at a current time. The current time may be the latest time for which sensor data and/or perception data is available. In some cases, the current scene context data includes a top-down representation of an environment of a vehicle at a current time.

In some cases, to determine a cost associated with a candidate trajectory based on a current state of the vehicle's environment, an example system may process the current state using a trained machine-learned model to generate a current state representation and determine the cost based on the current state representation. For example, the system may process the current environment state (e.g., a top-down representation of the vehicle environment) using a trained machine-learned model (e.g., a trained machine-learned model with one or more convolutional neural network layers) to determine the current state representation. In some cases, the current environment state representation includes a defined number of representation channels, where the number of representation channels may be defined by a hyper-parameter of the model used to determine the current scene context representation. In some cases, a channel of the environment state representation is a two-dimensional matrix with a defined height and width value, for example a defined height and width value determined based on dimensions of a top-down representation of the vehicle's environment. In some cases, the trained machine-learned model used to determine a current state representation may be trained using supervised learning techniques on a dataset of example environment states and corresponding example state representations. For example, the training data could include top-down representations of example vehicle environments labeled with the desired representation channels and values. The model may be trained by processing the example environment states to generate predicted state representations, comparing the predicted representations to the ground truth example representations, and updating the model parameters to reduce the difference. In any such example, ground truth may represent one or more of costs associated with a trajectory from log data, costs associated with a trajectory as driven by an expert human driver from the current state, costs associated with an optimal trajectory determined by a more comprehensive tree search using more computational resources, or otherwise.

In some cases, the techniques described herein relate to determining a cost associated with a candidate trajectory for a vehicle based on historical data representing a past behavior of the vehicle and/or an object in the vehicle's environment during a period before a current time. The historical data may, for example, be associated with a root node of a tree structure used to evaluate a candidate trajectory associated with the vehicle. The historical data may represent one or more previous actions and/or previous states associated with one or more objects (e.g., one or more vehicles including the ego vehicle for which a trajectory is being generated, one or more pedestrians, and/or the like) in the vehicle environment. In some cases, the historical data may represent one or more previous actions and/or previous states associated with one or more objects over a period of time, such as a statically or dynamically defined time period. In some cases, the historical data is a three-dimensional data structure, where a first dimension may be associated with the number of objects associated with the historical data, a second dimension may be associated with a number of timesteps captured by the historical data, and a third dimension may be associated with the number of engineered features represented by the historical data.

In some cases, to determine a cost associated with a candidate trajectory for a vehicle based on historical data, an example system processes the historical data using a trained machine-learned model to generate a historical representation and determines the cost based on the historical representation. For example, the historical representation may be determined by processing the received historical data using a trained machine-learned model (e.g., a trained machine-learned model with one or more recurrent neural network layers, such as one or more graph-based recurrent neural network layers). The historical representation may include a defined number of representation channels, where the number of representation channels may be defined by a hyper-parameter of the model used to determine the historical representation. In some cases, a channel of the historical representation may be a two-dimensional structure with a first dimension associated with the number of monitored objects in the environment and/or a second dimension associated with a number of engineered features for each object.

In some cases, the techniques described herein relate to determining a cost associated with a candidate trajectory for a vehicle based on prediction data representing one or more predicted states associated with the vehicle and/or one or more predicted states associated with one or more objects in the vehicle's environment. In some cases, the prediction data is associated with one or more downstream nodes of a trace of a tree structure that is associated with the candidate trajectory. The prediction data may include a state (e.g., at least one of a position, an orientation, a velocity, and/or the like) of one or more objects. The prediction data may be a three-dimensional structure, where a first dimension of the three-dimensional structure may be associated with a number of future timesteps captured by the predicted feature data (e.g., as determined based on a depth level of the target state node and/or the target state sample), a second dimension may be associated with a number of monitored objects in the environment, and/or a third dimension may be associated with a number of engineered features captured by the predicted feature data.

In some cases, to determine a cost associated with a candidate trajectory for a vehicle based on prediction data, an example system processes the prediction data using a trained machine-learned model to generate a prediction data representation and determines the cost based on the prediction data representation. For example, determining the prediction data representation may include processing the received prediction data using a trained machine-learned model (e.g., a trained machine-learned model including one or more graph neural network layers). In some cases, the prediction data representation may include a defined number of representation channels, where the number of representation channels may be defined by a hyper-parameter of the model used to determine the predicted feature representation. A channel of the prediction data representation may have a dimension corresponding to the number of monitored objects in the environment.

In some cases, at least two of a current state representation, a historical data representation, or a prediction data representation are aggregated to determine an aggregated representation. Aggregating two or more representations may include at least one of concatenating, averaging, summing, and/or the like. In some cases, aggregating two or more representations may include processing the representations using a trained machine-learned model. In some cases, after the aggregated representation is generated, the aggregated representation is used for determining a cost for a candidate trajectory. For example, the aggregated representation may be combined with data determined based on teleoperation data (e.g., a teleoperation data representation) to generate a hybrid representation that can then be used for determining a cost for a candidate trajectory.

In some cases, the techniques described herein relate to a cost associated with a candidate trajectory for a vehicle based on teleoperation data. The teleoperation data may represent at least one of: (i) whether the vehicle has received a teleoperation command in relation to a current time, or (ii) a feature associated with a teleoperation command received in relation to a current time. A teleoperation command may be a command provided by a remote system to a vehicle computing device, for example based on (e.g., in response to) a request by the vehicle computing device for such a command. In some cases, when the vehicle computing device determines that responding to a detected driving scenario requires external assistance, the vehicle computing device transmits a request for teleoperation assistance to a teleoperation component to receive a teleoperation command from the teleoperation component. In some cases, teleoperation component may perform at least some of the techniques described in U.S. Pat. No. 10,268,191, filed Jul. 7, 2017, and entitled "Predictive Teleoperation Situational Awareness," which is incorporated by reference herein in its entirety and for all purposes.

In some cases, a teleoperation command may recommend and/or require performance of a sequence of actions (e.g., traversing a path and/or a trajectory characterized by a sequence of waypoints, performing a sequence of movements, and/or the like). In some cases, an action recommended and/or required by the teleoperation command is associated with a feature set, such as at least one of a vertical position shift, a horizontal position shift, a heading, a velocity, an acceleration, and/or a yaw rate. In some cases, the feature sets associated with the sequence of actions may be processed by a machine-learned model (e.g., a sequential processing machine-learned model, such as a neural network model) to generate a teleoperation data representation. In some cases, the teleoperation data representation may be used to determine a cost for a candidate trajectory. For example, the teleoperation data representation may be combined with another representation (e.g., an aggregated representation as described above) to generate a hybrid representation, and the hybrid representation may then be processed by a machine-learned model to generate the cost associated with a candidate trajectory.

In some cases, an example system determines a cost associated with a candidate trajectory for a vehicle based on a teleoperation data representation associated with the vehicle. The teleoperation data representation may represent at least one of: (i) whether the vehicle has received a teleoperation command in relation to a current time (e.g., in relation to a current time associated with a root node of a tree structure used for candidate trajectory evaluation or any other time associated with a future node in the tree), or (ii) a feature of a teleoperation command received in relation to a current time. In some examples, the tree search may assume remote operation commands are received at a root note and determine how such commands impact the tree and/or assume commands are received at a node associated with a deeper layer (e.g., further in time) from the root node. For example, in some cases, if a vehicle has not received a teleoperation command in relation to a current time and/or if the vehicle computing device determines to ignore an impact of a teleoperation command, the teleoperation data representation associated with the current time may have a default value (e.g., may be an all-zero representation, such as an all-zero vector). As another example, in some cases, if a vehicle has received a teleoperation command in relation to a current time, the teleoperation data representation associated with the current time may be determined by processing a set of (e.g., a sequence of) actions associated with the received teleoperation command using a trained machine-learned model. The trained machine-learned model may include at least one of a recurrent neural network, a transformer machine-learned model (e.g., an attention-based transformer machine-learned model with an attention mechanism, such as with a self-attention mechanism), a feedforward neural network, and/or the like.

In some cases, an example system combines a teleoperation data representation and an aggregated data representation to generate a hybrid representation (e.g., a combined embedding) and then processes the hybrid representation to determine a cost associated with a candidate trajectory. Combining the two representations may include at least one of concatenating, averaging, summing, and/or the like. In some cases, combining the two representations may include processing the representations using a trained machine-learned model. In some cases, after the hybrid representation is generated, the hybrid representation is processed using a trained machine-learned model to generate a cost associated with a trajectory. For example, the trained machine-learned model may include N portions (e.g., N heads), where the N portions may be configured to generate N cost measures, and the N cost measures may then be aggregated to determine an overall cost measure for the trajectory. Each cost measure may represent a measure of cost associated with a trajectory that is associated with the target state node and/or the target state sample. Examples of such costs include progression cost, policy adherence cost, safety cost, and/or the like. In some cases, the cost measure associated with a trajectory may be determined by processing one or more cost measures associated with the trajectory using a cost determination model. The cost determination model may, for example, be a weighted combination model, a regression model (e.g., a linear regression model, and/or the like), and/or the like.

In some cases, the techniques described herein relate to controlling a vehicle (e.g., an autonomous vehicle) based on a cost. In some cases, a cost associated with a candidate trajectory is used to determine how to explore a tree structure during tree search (e.g., whether to expand a node associated with the trajectory, such as a deepest node associated with the trace corresponding to the trajectory). Once fully expanded (e.g., until a termination criterion is reached—such as a depth, a distance from the root node, a time from the root node, etc.), an optimal trajectory may be determined as a trace of the tree associated with a lowest cost. For example, an example system may select a trajectory having the lowest cost as an optimal trajectory and control the vehicle based on the optimal trajectory. As another example, an example system may validate a trajectory (e.g., a trajectory determined by another component of a vehicle computing device, such as by another component of a vehicle computing device) based on determining that the cost associated with the candidate trajectory falls below a threshold. In some cases, based on determining that the cost associated with a candidate trajectory (e.g., a candidate trajectory determined by a planning component of a vehicle computing device) falls below the threshold, the vehicle is controlled based on the validated candidate trajectory.

In some cases, the techniques described herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques described herein can be implemented to reduce computational costs associated with candidate trajectory evaluation. In some cases, the techniques described herein enable processing non-teleoperation data (e.g., environment state data, historical data, and/or prediction data) and teleoperation data using the same machine-learned framework. This reduces the need for performing operations associated with processing non-teleoperation data and teleoperation data, for example by avoiding the need to process such data using two separate machine-learned frameworks. Additionally, by avoiding the need for performing operations associated with processing non-teleoperation data and teleoperation data using two separate machine-learned frameworks, the techniques described herein may reduce the need for storage of configuration data associated with two separate machine-learned frameworks. This may reduce the storage cost associated with processing non-teleoperation data and teleoperation data to evaluate a candidate trajectory.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using trajectory planning techniques and are not limited to vehicles. Moreover, although various trajectory planning operations are described as being performed by a planning component of a vehicle computing device, a person of ordinary skill in the relevant technology will recognize that the planning component may be deployed on other computing devices, such as on a remote computing device that communicates with a vehicle computing device using a networked connection.

FIG. 1 illustrates a schematic diagram of an environment 100 with an example vehicle in communication with a remote operator, according to at least one example. In various examples, a vehicle computing system 110 may be configured to autonomously control the vehicle 102 through the environment 100. In at least one example, the vehicle computing system 110 may be configured to request teleoperation control from a remote operator. Although the example implementation depicted in FIG. 1 includes a human operator, a person of ordinary skill in the relevant technology will recognize that the operator may be an automated system (e.g., an automated software application. In some cases, the vehicle computing system 110 may establish a connection with the computing device 104 associated with the remote operator. In some examples, the remote operator associated with the computing device 104 may receive sensor data associated with the environment 100 (e.g., sensor data indicating an object in the environment 100) and, based on the sensor data, may generate a teleoperation command with an instruction to cause the vehicle 102 to perform an action, such as to navigate to a particular location (e.g., with a particular speed), enter an autonomous driving mode, exit an autonomous driving mode, and/or other such actions. The computing device 104 may then transmit the teleoperation command to the vehicle 102.

In some examples, sensor data may be received from one or more sensor(s) 112 mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. For example, the vehicle computing system 110 may receive sensor data of the environment 100 from one or more dashcams mounted on the vehicle 102, and the sensor data may indicate an object, such as a vehicle with a protruding object, a traffic cone, a hazard road sign, fencing, a double-parked vehicle, and/or the like. The vehicle computing system 110 may send the sensor data to the computing device 104, and the computing device 104 may generate the instruction to stop movement of the vehicle 102 based at least in part on the sensor data and may also cause the vehicle 102 to exit an autonomous driving mode and enter a manual control mode for navigating the environment 100.

In some examples, the sensor data may be received from one or more remote sensors, such as, for example, sensors mounted on one or more other vehicles and/or sensors mounted in the environment 100. For example, one or more remote sensors may be mounted in the environment 100 to provide additional visibility in an area of reduced visibility, such as, for example, in a blind or semi-blind intersection. In an example, the computing device 104 may receive sensor data of the environment 100 from one or more traffic monitoring cameras mounted at an intersection, and the sensor data may indicate a hazardous object.

In various examples, the vehicle computing system 110 may communicate with the computing device 104 via a network 108. In at least one example, the computing device 104 may include a user interface 106 via which a request for a teleoperation command and/or sensor data received from the vehicle 102 may be viewed. The user interface 106 may enable the teleoperator to enter a teleoperation command for transmission to the vehicle 102.

The vehicle 102 may include a vehicle computing device 114 that includes a planning component 116 and a perception component 118. In at least one example, the perception component 118 can perform object detection, segmentation, and/or classification based at least in part on sensor data received from the sensor(s) 112. In at least one example, the perception component 118 can receive raw sensor data (e.g., from the sensor(s) 112). In other examples, the perception component 118 can receive processed sensor data (e.g., from the sensor(s) 112). For instance, in at least one example, the perception component 118 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception component 118 for one or more other modalities (e.g., lidar, RADAR, ToF sensors, etc.). The perception component 118 may further be configured to determine a location and/or a motion status of the vehicle 102, to include the physical location of the vehicle as well as vehicle velocity, acceleration, speed, or other such data that may be used to determine when the vehicle is stationary or moving and/or in a suitable location for engaging or disengaging autonomous mode, as described herein.

In at least one example, the planning component 116 can determine routes and/or trajectories to use to control the vehicle 102 based at least in part on sensor data received from the sensor(s) 112 and/or any determinations made by the perception component 118. Additional details of a perception system and/or planning system that are usable can be found in U.S. Pat. No. 9,612,123, issued on Apr. 4, 2017, and U.S. patent application Ser. No. 15/632,208, filed Jun. 23, 2017, the entire contents of both of which are incorporated by reference herein. In some examples (e.g., where the vehicle 102 is not an autonomous vehicle), one or more of the aforementioned systems and/or components can be omitted from the vehicle 102. While the systems described above are illustrated as "onboard" the vehicle 102, in other implementations, the systems can be remotely located and/or accessible to the vehicle 102.

In some examples, the computing device 104 may receive a request for teleoperation control, for example to provide a teleoperation command to a vehicle 102. The request may be initiated from a teleoperator in response to the autonomous vehicle observing or encountering a situation such as a law enforcement interaction. In an example, in response to encountering an emergency services vehicle or personnel, the autonomous vehicle may convey information to the teleoperator indicating the presence and querying the teleoperator whether a request to disengage from an autonomous mode may be appropriate. In an example, the computing device 104 may receive, from the autonomous vehicle, information related to the environment, such as the presence of emergency services personnel or vehicles. The computing device 104 may present an option for a teleoperator to request to disengage from autonomous mode in response to the presence of emergency services. The teleoperator may select the option and generate the request to disengage from autonomous mode. In some examples, the computing device 104 may receive the request based on a teleoperator or other operator inputting a request for an autonomous vehicle to enter and/or exit an autonomous mode in response to entering or exiting a service depot. The computing device 104 may include a user interface 106 through which the request is received.

In some cases, the planning component 116 may be configured to determine a cost for a candidate trajectory and use the determined cost to determine whether to control the vehicle 102 based on the trajectory. For example, the planning component 116 may be configured to determine a cost associated with a candidate trajectory using the process 120. As depicted in FIG. 1, the process 120 begins at operation 122 when the planning component 116 determines a first representation based on current state data representing a current state of the environment of the vehicle 102, historical data representing a past behavior of the vehicle 102 and/or an object in the vehicle's environment, and prediction data representing one or more predicted future states of the vehicle 102 and/or an object in the vehicle's environment. In some cases, the planning component 116 determines the first representation by aggregating a representation of the current state data, a representation of the historical data, and a representation of the prediction data. In some cases, the current state data and/or the historical data are represented by a root node of a tree structure that may be used for trajectory planning for the vehicle 102, while the prediction are represented by one or more downstream nodes of a trace associated with the tree structure.

At operation 124, the planning component 116 determines a second representation based on teleoperation data associated with a corresponding time (e.g., at a current time or a future time). In some cases, the remote operation data is associated with a tree structure as a whole (e.g., with a root node of the tree structure), while in other cases one or more of the nodes (e.g., representing one or more predicted future states) of the tree structure may be associated with distinct remote operation data. In some cases, the remote operation data associated with a first subset of nodes may be different than the teleoperation data associated with a second subset of nodes. The teleoperation data may represent that the vehicle 102 has not received a teleoperation command in relation to the corresponding time. In some cases, if the teleoperation command represents the vehicle 102 has not received a teleoperation command in relation to the corresponding time (or, otherwise, the likelihood of receiving a teleoperation command is low/precluded at a time associated with a node in a tree search), the second representation may have a default value (e.g., an all-zero value). The teleoperation data may alternatively represent that the vehicle 102 has received a teleoperation command in relation to the corresponding time. In some cases, if the teleoperation command represents the vehicle 102 has received a teleoperation command in relation to the corresponding time, the second representation may be generated by processing one or more (e.g., a set of, such as a sequence of) actions recommended by the teleoperation command using a machine-learned model, such as using a machine-learned model that includes a recurrent neural network.

At operation 126, the planning component 116 determines a combined representation based on the first and the second representations. For example, the planning component 116 may concatenate and/or average the two representations to determine the combined representations. The first and second representations may have the same size or may have different sizes.

At operation 128, the planning component 116 determines a cost associated with a candidate trajectory based on the combined representation. In some cases, the planning component 116 may determine the candidate trajectory cost by processing the combined representation using a machine-learned model. For example, the planning component 116 may process the combined representation using N portions of a machine-learned model to determine N cost measures. The planning component 116 may combine the N cost measures to determine the candidate trajectory cost. In some cases, each node of the tree structure may be evaluated based on the teleoperation data and using the techniques described herein. Evaluating a node may include determining a cost associated with a trajectory that corresponds to the node. A cost of a node may be used to determine how to explore a tree structure during tree search.

FIG. 2 provides an operational example 200 of a tree structure 202 that may be used to perform trajectory planning for a vehicle. The tree structure 202 includes one or more state nodes and one or more action nodes. A state node may be a collection of one or more state samples 222. A state sample may represent data about an object in the vehicle environment, such as a predicted object intent. Object intents can represent a level of attentiveness of the object, such as whether the object will react to the vehicle with a first level of reactiveness or a second level of reactiveness, or in some cases, not react to the vehicle during a sample. In various examples, different levels of reactiveness can be associated with different maximum thresholds for the object to accelerate, brake, or steer. The object intent can include, for example, one or more of: a) a reactive intent in which an object changes lanes, brakes, accelerates, decelerates, etc. relative to the vehicle, b) a nominal intent in which the object changes lanes, brakes, accelerates, decelerates, etc. less aggressively than the reactive intent such as decelerate to allow the vehicle to lane change, c) an un-attentive intent in which the object refrains from reacting to the vehicle, d) a right turn intent, e) a left turn intent, f) a straight intent, g) an accelerating intent, h) a decelerating intent, i) a parking intent, j) a remain in place intent, etc.). The action nodes may correspond to a set of actions 224 (e.g., a turning action, braking action, acceleration action such as yielding to or slowing for an object to safely enter in front of the vehicle). In at least some examples, such actions may comprise alternative trajectories and the nodes may specify which of the action trajectories should be tracked (used as a reference for motion) at a given point in time associated with the node.

In some examples, the object intents corresponding to the state samples of the tree structure 202 can be associated with a most relevant object(s) to the vehicle. For example, the system may receive one or more objects determined to be relevant to the vehicle by another machine learned model configured to identify a relevant object from among a set of objects in an environment of the vehicle. The machine learned model can determine the relevant object based at least in part on a relevancy score associated with each object in the set of objects and/or object(s) within a threshold distance from the vehicle. Additional examples of determining relevance of an object are described in U.S. patent application Ser. No. 16/530,515, filed on Aug. 2, 2019, entitled "Relevant Object Detection," Ser. No. 16/417,260, filed on May 30, 2019, entitled "Object Relevance Determination," and Ser. No. 16/389,720, filed on May 6, 2019, entitled "Dynamic Object Relevance Determination," all of which are incorporated herein by reference in their entirety and for all purposes.

In some examples, a state node(s) of the tree structure 202 can be associated with one or more regions surrounding the vehicle (e.g., a region most likely to include a potential intersection point with an object). For example, the system can receive one or more regions determined by a model configured to identify a relevant region from among a set of regions in the environment of the vehicle. For instance, the tree structure can include node(s) to represent an occluded region, a region in front of the vehicle, or other area within a predetermined distance of the vehicle. In some examples, the vehicle is a bi-directional vehicle, and as such, the model can define, identify, or otherwise determine the rear region relative to a direction of travel as the vehicle navigates in the environment. For instance, the rear region of the vehicle can change depending upon the direction of travel. In at least some examples, the environment may be encoded as a vector representation and output from a machine learned model as an embedding. Such an embedding may be used in predicting the future state(s) or intent(s) of the object. As such, the state samples 22 may represent a state of the vehicle, one or more objects proximate the vehicle, the environment through which the vehicle is traversing, or any other representation of how the environment evolves given the action of the immediately preceding node. As shown, for example in a fifth node 212, such an action may result in a variety of states of beliefs and the distribution of beliefs may be recorded and stored in the tree structure.

The tree structure 202 includes a first node 204, a second node 206, a third node 208, a fourth node 210, a fifth node 212, a sixth node 214, a seventh node 216, an eighth node 218, and a ninth node 220, though other number of nodes are possible. For instance, the first node 204 can include four different object intents as depicted by different shading. The second node 206, the third node 208, and the fourth node 210 can be associated with corresponding vehicle actions (e.g., a proposed action or action for the vehicle to take in the future). In various examples, the second node 206, the third node 208, and/or the fourth node 210 can represent actions for applying to the vehicle over a period of time.

In the example illustrated, intents grouped together may either elicit a similar or same response from the vehicle and/or have substantially similar probabilities/confidences/likelihoods of occurrence. As illustrated, taking certain actions by the vehicle may aid in differentiating a response of the object as illustrated by varying groupings of object intents in response to vehicle actions. Further differentiation of the object intents may, in some instances, yield better responses by the vehicle to the environment (e.g., safer, more efficient, more comfortable, etc.).

The tree structure 202 is associated with a period of time as shown in FIG. 2. For example, time TO represents a first time of the tree structure 202 and is generally associated with the first node 204 and the second node 206. Each progression of the tree structure 202 to a new node does not necessarily imply a new time (e.g., T0, T1, etc. is not scaled to the nodes in FIG. 2 but used to show a progression of time generally). In some examples, each layer of the tree structure can be associated with a particular time (e.g., the first node 204, the second node 206, the third node 208, and the fourth node 210 are associated with time TO, the fifth node 212, the sixth node 214, the seventh node 216, the eighth node 218, and the ninth node 220 are associated with time T1, and so on for additional branches or nodes (not shown) up to time TN, where N is an integer. In various examples, different layers, branches, or nodes can be associated with different times in the future. In various examples, scenarios associated with one or more of the nodes of the tree structure 202 can run in parallel on one or more processors (e.g., Graphics Processing Unit (GPU) and/or Tensor Processing Unit (TPU), etc.).

In some examples, at time T1 the vehicle takes an action associated with the third node 208 at the fifth node 212, followed by additional scenarios to test how the vehicle responds to the four object intents of the fifth node 212. Thus, the fifth node 212 can represent multiple scenarios over a time period. Further, the tree structure 202 can represent a vehicle action associated with the second node 206, and perform additional tests at time T1 to determine how the vehicle responds to the object intent of the sixth node 214 (e.g., turn left intent) and the three object intents of the seventh node 216. In some examples, the three object intents of the seventh node 216 can include a same outcome, such as the object having a straight intent but each straight intent may be associated with different levels of response to the vehicle (e.g., different velocities, accelerations, and/or braking capabilities). In various examples, the sixth node 214 (or another node having a single object intent) enables evaluation of a specific object intent (e.g., a left turn that is less likely to occur that, for example, the object continuing straight and not turning left) on the vehicle trajectory determination.

In various examples, a different vehicle action at the fourth node 210 can cause additional tests (scenarios) to be performed to determine how the vehicle responds to the two object intents of the eighth node 218 and the two object intents of the ninth node 220.

Note that in the depicted example in FIG. 2, the nodes after the vehicle actions in time (e.g., second node 206, third node 208, and fourth node 210) can be considered sub-nodes, or child nodes, and the total number of object intents between sub-nodes equals an amount of object intents in the first node 204. For example, the sixth node 214 and the seventh node 216 have four object intents combined, which is equal to the four object intents of the first node 204. In other examples, however, the object intents can change between nodes and the number of object intents can also vary by node (e.g., may be more or less than the number of object intents in the first node of the tree structure).

In some examples, additional nodes (not shown) can be searched in the tree structure 202 to test another object intent or group of object intents. For example, at time T2, a new set of samples and/or a new set of object intents can be associated with a node of the tree structure 202 based at least in part on an output of a previous node. In some examples, a new combination of object intents can be assigned to a node by a model to further consider different object actions when determining a vehicle trajectory. By receiving a new set of samples different from the set of samples used in previous nodes, nodes of the tree structure 202 can be "re-sampled" dynamically during a tree search, for example.

In various examples, the system can generate the tree structure 202 based at least in part on one or more of: an attribute (e.g., position, velocity, acceleration, yaw, etc.) of the objects, history of the objects (e.g., location history, velocity history, etc.), an attribute of the vehicle (e.g., velocity, position, etc.), and/or features of the environment (e.g., roadway boundary, roadway centerline, crosswalk permission, traffic light permission, and the like). In some examples, a node of the tree structure 202 can be associated with various costs (e.g., comfort cost, safety cost, distance cost, brake cost, obstacle cost, etc.) usable for determining a potential intersection point between the vehicle and the object in the future. A comfort cost may be a measure of passenger comfort while continuing a trajectory. For example, a trajectory with high levels of traffic may have a higher comfort cost relative to a trajectory with a lower comfort cost.

Figure 3:
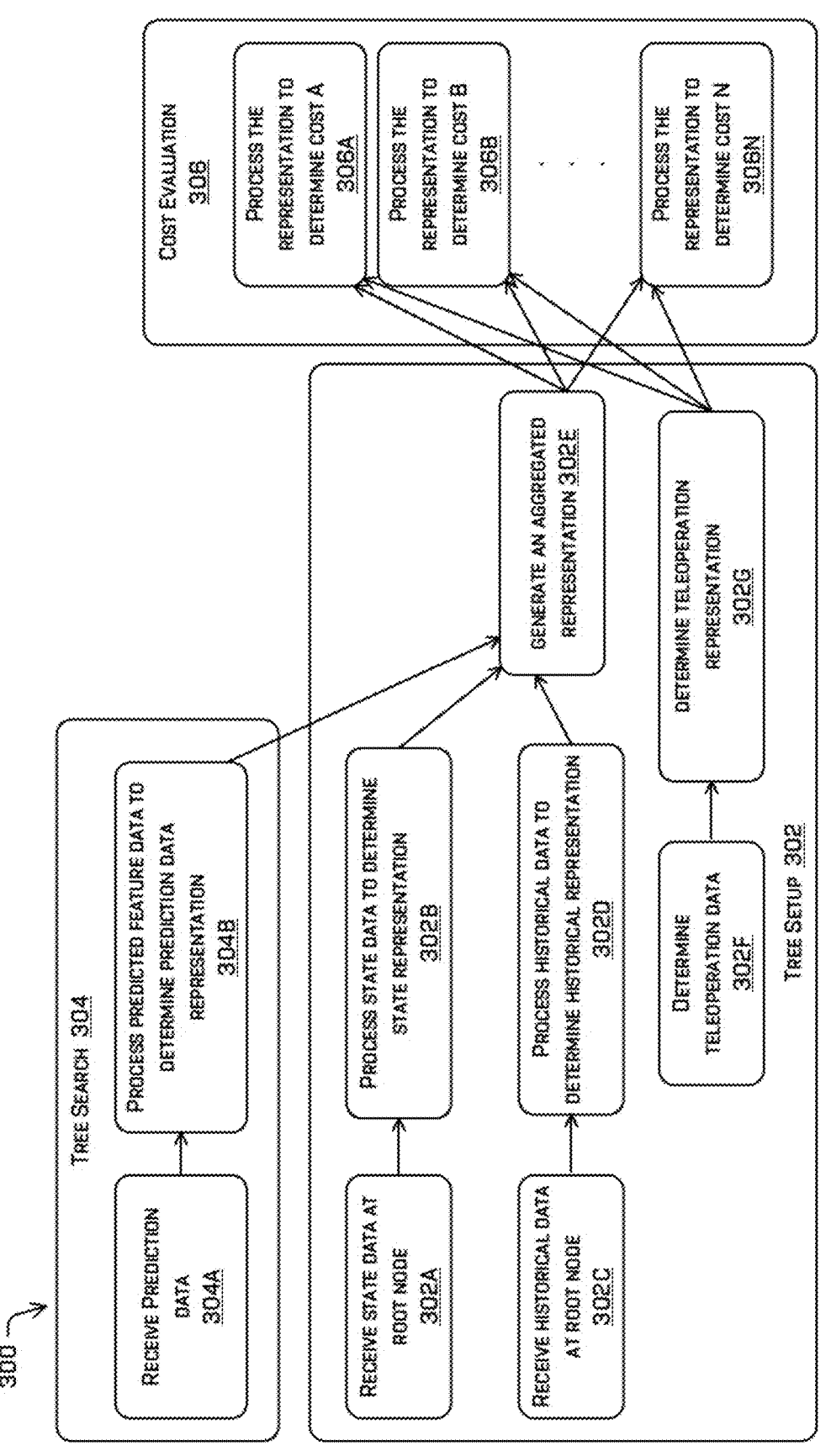
FIG. 3 is a flowchart diagram of an example process for determining one or more cost measures for a trajectory using a tree structure.

FIG. 3 is a flowchart diagram of an example process 300 for determining one or more cost measures for a trajectory using a tree structure. As depicted in FIG. 3, the process 300 includes three phases: tree setup phase 302, tree search phase 304, and cost evaluation phase 306. The tree setup phase 302 may include determining data associated with the root node of the tree structure. The tree search phase 304 may include determining predicted state data associated with a future predicted state represented by a downstream node of the tree structure and/or a state sample of a downstream node of the tree structure. The cost evaluation phase 306 phase may include determining N cost measures for a trajectory associated with a trace of the tree structure based on the root node data generated by the tree setup phase 302 and predicted state data generated by the tree search phase 304. In some cases, operations associated with the tree setup phase 302 are performed once to set up the tree search (e.g., the operations may be performed a single time and the output of which combined with other downstream states), while operations associated with tree search phase 304 may be performed with respect each of one or more nodes (e.g., for each node) of the tree structure. In some cases, operations 302F and 302G may be performed as part of the tree search phase 304, such that, in some cases, operations 302F and 302G may be performed with respect to each of one or more nodes (e.g., for each node) of the tree structure.

As depicted in FIG. 3, at operation 302A, the tree setup phase 302 includes receiving current state data associated with the root node of a tree structure. Examples of current state data are described above. At operation 302B, the tree setup phase 302 includes determining a current state representation based on the current state data. For example, an example system may process the current state data using a trained machine-learned model (e.g., a trained machine-learned model with one or more convolutional neural network layers) to determine the current state representation. Throughout, such representations may comprise embeddings or otherwise.

As further depicted in FIG. 3, at operation 302C, the tree setup phase 302 includes receiving historical data associated with the vehicle and/or one or more objects in the vehicle's environment. The historical data may represent one or more previous vehicle actions and/or one or more previous object (e.g., dynamic object) actions. Examples of the historical data are described above. At operation 302D, the tree setup phase 302 includes determining a historical representation based on the historical data. For example, an example system may process the historical data using a trained machine-learned model (e.g., a trained machine-learned model with one or more recurrent neural network layers, such as one or more graph-based recurrent neural network layers) to determine the historical representation.

As further depicted in FIG. 3, at operation 304A, the tree search phase 304 includes receiving prediction data associated with one or more downstream nodes of the tree structure. The prediction data may represent one or more predicted object states and/or one or more predicted vehicle states. Examples of the prediction data are described above. At operation 304B, the tree search phase 304 includes determining a prediction data representation based on the prediction data. For example, an example system may process the prediction data using a trained machine-learned model (e.g., a trained machine-learned model with one or more graph neural network layers) to determine the prediction data representation.

As further depicted in FIG. 3, at operation 302E, the tree setup phase 302 includes aggregating the prediction data representation, the current state representation, and the historical representation to generate a combined representation. The combined representation may be determined by aggregating (e.g., concatenating) the prediction data representation, the current state representation, and the historical representation to generate a combined representation. Example techniques for aggregating representations are described above.

As further depicted in FIG. 3, at operation 302F, the tree setup phase 302 includes receiving teleoperation data associated with the vehicle. The teleoperation data may be associated with a current time associated with the root node of the tree structure. Examples of teleoperation data are described above. At operation 302G, the tree setup phase 302 includes determining a teleoperation representation based on the teleoperation data. Determining a teleoperation representation may be based on at least one of: (i) whether the teleoperation data represents that a teleoperation command has been received in relation to a current time, or (ii) processing a feature associated with a received teleoperation command using a machine-learned model (e.g., a recurrent neural network, such as a Long Short Term Memory (LSTM) model). Example techniques for determining a teleoperation data representation based on teleoperation data received in relation to a current time are described above.

As further depicted in FIG. 3, at operations 306A-306N, the cost evaluation phase 306 includes processing the combined representation and the teleoperation data representation using N portions (e.g., heads) of a machine-learned model to determine N cost measures. Examples of cost measures are described above. Accordingly, at operation 306A, the cost evaluation phase 306 includes processing the combined representation and the teleoperation data representation using a first model portion to determine a first cost measure; at operation 306B, the cost evaluation phase 306 includes processing the combined representation and the teleoperation data representation using a first model portion to determine a second cost measure; at operation 306N, the cost evaluation phase 306 includes processing the combined representation and the teleoperation data representation using a first model portion to determine an Nth cost measure; and so on. The N cost measures may, in some cases, be combined to determine a final cost measure that may be used for trajectory evaluation and/or selection. Examples of such costs include progression cost (e.g., whether the vehicle is moving towards a desired endpoint or state), policy adherence cost (e.g., a cost penalizing deviations from a policy), safety cost (e.g., a cost associated with how safely the vehicle is operating), a comfort cost (e.g., a cost associated with how comfortable the controls will be for an internal passenger), and/or the like.

Figure 4:
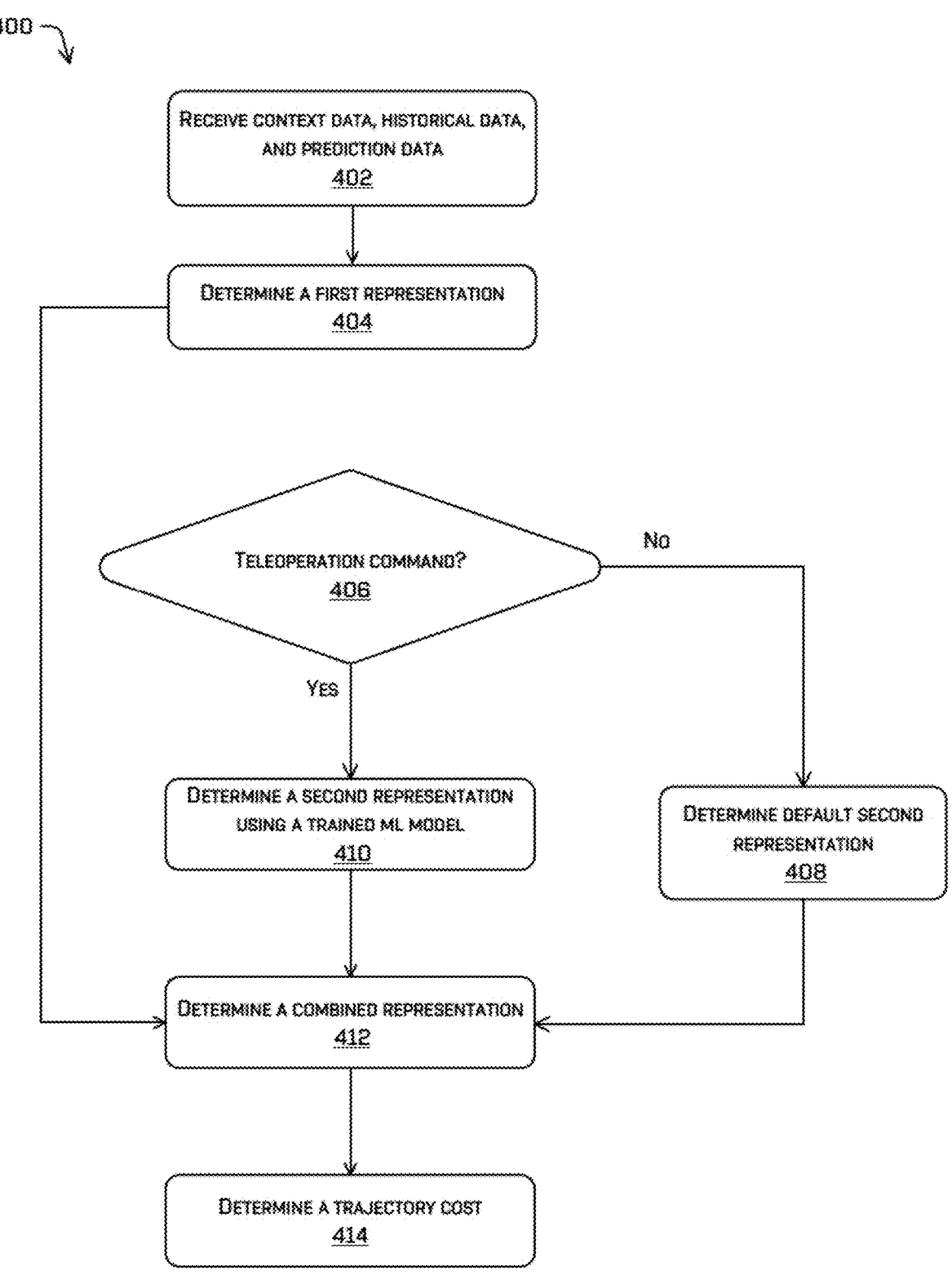
FIG. 4 is a flowchart diagram of an example process for determining a cost associated with a trajectory based on teleoperation data associated with a current time.

FIG. 4 is a flowchart diagram of an example process 400 for determining a cost associated with a trajectory based on teleoperation data associated with a current time. At operation 402, an example system receives current state data representing a current state of the environment of a vehicle, historical data representing a past behavior of the vehicle and/or an object in the vehicle's environment, and prediction data representing one or more predicted future states of the vehicle and/or an object in the vehicle's environment. Examples of current state data, historical data, and prediction data are described above.

At operation 404, the system determines a first representation based on the current state data, the historical data, and the prediction data. In some cases, the system determines the first representation based on a current state representation determined based on the current state data, a historical representation determined based on the historical data, and a prediction data representation determined based on the prediction data. For example, the system determines the first representation by aggregating the current state representation, the historical representation, and the prediction data representation. Example techniques for aggregating representations are described above.

At operation 406, the system receives teleoperation data associated with a current time. The teleoperation data may represent whether the vehicle has received a teleoperation command at a current time and/or a feature associated with a teleoperation command.

At operation 408, the system determines whether the teleoperation data represents that the vehicle has received a teleoperation command. If the system determines that the teleoperation data represents that the vehicle has not received a teleoperation command (operation 408—No), the system proceeds to operation 410 to determine a default (e.g., an all-zero) second representation. If the system determines that the teleoperation data represents that the vehicle has received a teleoperation command (operation 408—Yes), the system proceeds to operation 412 to determine a second representation using a trained machine-learned model. In some cases, the system processes the teleoperation data (e.g., a sequence of actions represented by the teleoperation data) using the trained machine-learned model (e.g., a recurrent neural network) to determine the second representation.

At operation 414, the system determines a hybrid representation based on the first and the second representations. In some cases, the system combines (e.g., concatenates and/or averages) the two representations to determine the hybrid representation.

At operation 416, the system determines a cost associated with the trajectory based on the hybrid representation. In some cases, the system processes the hybrid representation using a trained machine-learned model to determine the trajectory cost. For example, the system may determine (e.g., using the example techniques above) N cost measures by processing the hybrid representations and then combine the N cost measures to determine the overall trajectory cost.

Figure 5:
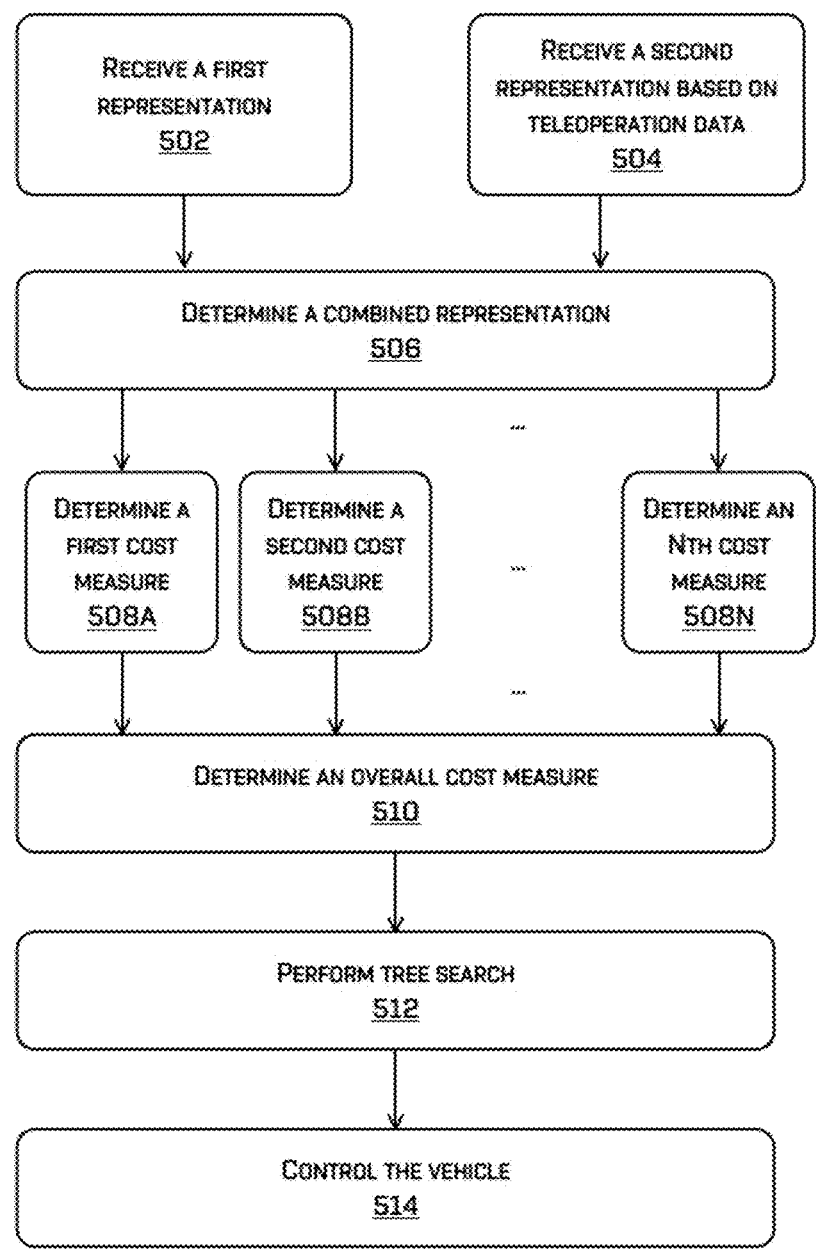
FIG. 5 is a flowchart diagram of an example process for controlling a vehicle based on teleoperation data associated with the vehicle.

FIG. 5 is a flowchart diagram of an example process 500 for controlling a vehicle based on teleoperation data associated with the vehicle. As depicted in FIG. 5, at operation 502, an example system receives a first representation. The first representation may be determined based on at least one of current state data representing a current state of the environment of a vehicle, historical data representing a past behavior of the vehicle and/or an object in the vehicle's environment, or prediction data representing one or more predicted future states of the vehicle and/or an object in the vehicle's environment.

At operation 504, the system receives a second representation. The second representation may be determined based on teleoperation data associated with a vehicle. For example, the second representation may: (i) indicate, via a default value, that the vehicle has not received a teleoperation command in relation to a current time, or (ii) represent the output of processing a feature (e.g., a set of features associated with a set of actions) corresponding to the teleoperation command using a trained machine-learned model (e.g., a recurrent neural network).

At operation 506, the system determines a hybrid representation based on the first and the second representation. Example techniques for determining the hybrid representation based on two representations are described above.

At operations 508A-508N, the system determines N cost measures based on the hybrid representations. In some cases, the N cost measures may be determined using N portions (e.g., heads) of a trained machine-learned model. Example techniques for determining cost measures and example cost measures are described above. Accordingly, in some cases, the system determines a first cost measure at operation 508A, a second cost measure at operation 508B, and an Nth cost measure at operation 508N.

At operation 510, the system determines an overall cost for the one or more predicted states based on the N cost measures. The system may determine the overall trajectory cost by combining (e.g., averaging, jointly processing, and/or the like) the N cost measures. Example techniques for determining an overall cost based on N cost measures are described above.

At operation 510, the system performs tree search based on the overall trajectory cost (e.g., estimated cost for a trajectory associated with the node currently being evaluated). In some cases, determines whether to expand the node(s) corresponding to the one or more predicted states during tree search is based on the overall cost. For example, the system may expand the node(s) if the overall cost meets or falls below a threshold, if it is associated with a lowest N costs of nodes of a current layer in the tree, or the like.

At operation 514, the system controls the vehicle based on the overall cost. After the tree search, the system may determine whether to adopt a candidate trajectory based on a trajectory cost determined using the expanded tree structure (e.g., based on whether the cost falls below a threshold, based on whether the cost is the lowest cost among costs associated with a set of candidate trajectories, and/or the like). In some cases, if the system determines to adopt the candidate trajectory, the system controls one or more operations of the vehicle based on the adopted trajectory.

Figure 6:
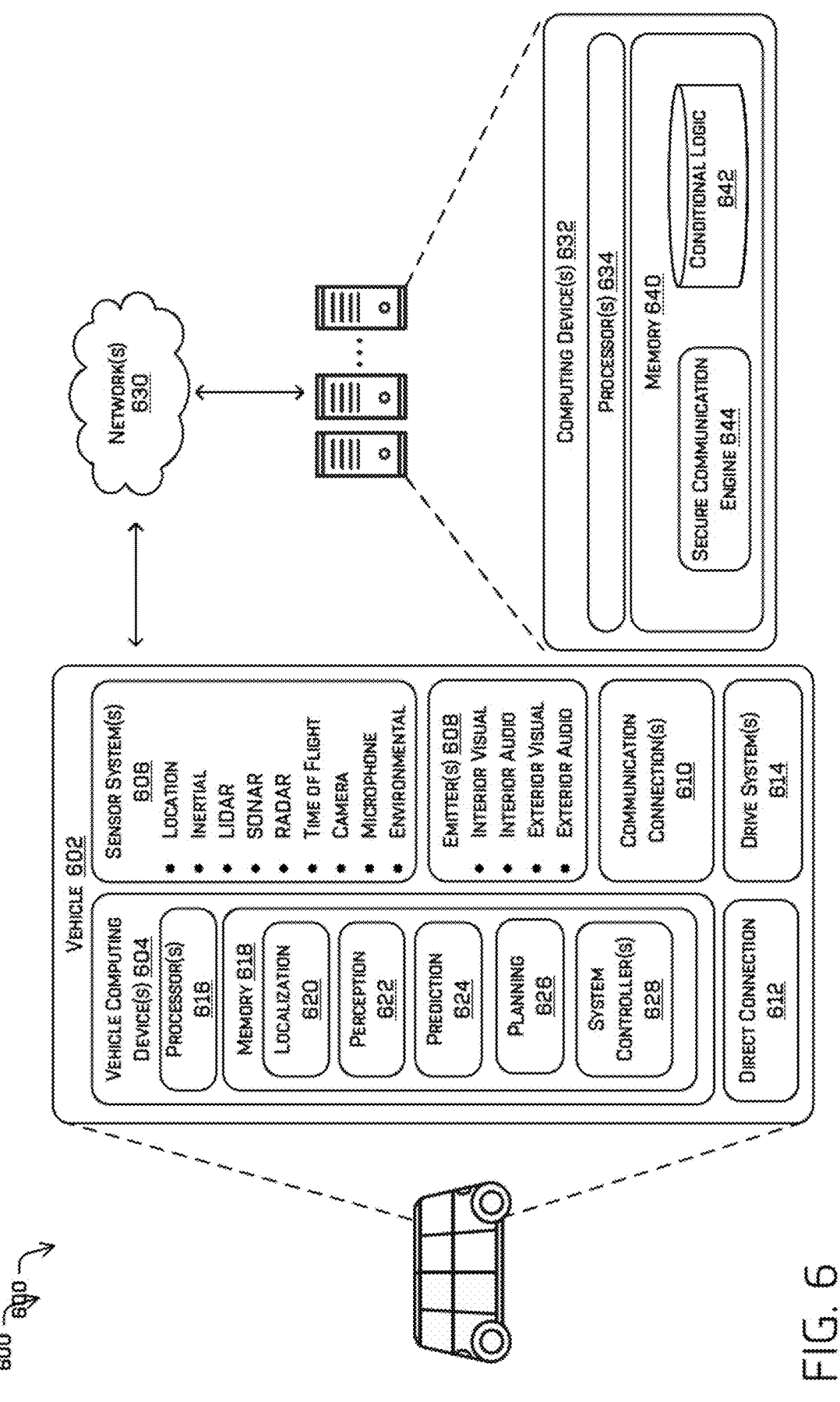
FIG. 6 is a block diagram illustrating an example system for processing requests to engage and disengage from an autonomous mode.

FIG. 6 is a block diagram illustrating an example system 600 for processing requests to engage and disengage from an autonomous mode. In at least one example, a vehicle 602 can include one or more vehicle computing device(s) 604, one or more sensor system(s) 606, one or more emitter(s) 608, one or more communication connection(s) 610, at least a direct connection 612, and one or more drive system(s) 614. For the purpose of illustration, the vehicle 602 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 602 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle.

In at least one example, the vehicle 602 can be a data collection device. In an additional or alternative example, the one or more components of the AI stack described above can be associated with the vehicle 602. That is, the simulated environment described herein can be used to train, test, and/or validate one or more of the components described below with reference to vehicle 602.

The vehicle computing device(s) 604 can include processor(s) 616 and memory 618 communicatively coupled with the processor(s) 616. In the illustrated example, the memory 618 of the vehicle computing device(s) 604 stores a localization system 620, a perception system 622, a prediction system 624, a planning system 626, one or more system controller(s) 628, and conditional logic 642. Additionally, the memory 618 can include a storage (not shown), which can store map(s), model(s), etc. A map can be any number of data structures modeled in two dimensions, three dimensions, or N dimensions that are capable of providing information about an environment, such as, but not limited to, topologies (such as intersections), streets, mountain ranges, roads, terrain, and the environment in general. Maps can be associated with real environments or simulated environments. Model(s) can include machine-trained models, as described below.

In at least one example, the localization system 620 can determine a pose (e.g., a position and an orientation) of the vehicle 602 in relation to a local and/or global map based at least in part on sensor data received from the sensor system(s) 606 and/or map data associated with a map (e.g., of the map(s)). In at least one example, the localization system 620 can include, or be associated with a calibration system that is capable of performing operations for calibrating (determining various intrinsic and extrinsic parameters associated with any one or more of the sensor system(s) 606), localizing, and mapping substantially simultaneously. Additional details associated with such a system are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein. As described above, the localization system 620 can output road network data and/or a road mesh based on the sensor data received by the sensor system(s) 606.

In at least one example, the perception system 622 can perform object detection, segmentation, and/or classification based at least in part on sensor data received from the sensor system(s) 606. In at least one example, the perception system 622 can receive raw sensor data (e.g., from the sensor system(s) 606). In other examples, the perception system 622 can receive processed sensor data (e.g., from the sensor system(s) 606). For instance, in at least one example, the perception system 622 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception system 622 for one or more other modalities (e.g., lidar, RADAR, ToF sensors, etc.).

The prediction system 624 can access sensor data from the sensor system(s) 606, map data associated with a map (e.g., of the map(s) which can be in the storage), and/or perception data output from the perception system 622 (e.g., processed sensor data), and can output predictions associated with one or more objects within the environment of the vehicle 602. In at least one example, the planning system 626 can determine routes and/or trajectories to use to control the vehicle 602 based at least in part on sensor data received from the sensor system(s) 606 and/or any determinations made by the perception system 622. Additional details of localizer systems, perception systems, prediction systems, and/or planning systems that are usable can be found in U.S. Pat. No. 9,612,123, issued on Apr. 4, 2017, and U.S. patent application Ser. No. 15/632,208, filed Jun. 23, 2017, the entire contents of both of which are incorporated by reference herein. In some examples (e.g., where the vehicle 602 is not an autonomous vehicle), one or more of the aforementioned systems and/or components can be omitted from the vehicle 602. While the systems described above are illustrated as "onboard" the vehicle 602, in other implementations, the systems can be remotely located and/or accessible to the vehicle 602.

In at least one example, the localization system 620, the perception system 622, the prediction system 624, and/or the planning system 626 can process sensor data, as described above, and can send their respective outputs over network(s) 630, to computing device(s) 632. In at least one example, the localization system 620, the perception system 622, the prediction system 624, and/or the planning system 626 can send their respective outputs to the computing device(s) 632 at a particular frequency, after a lapse of a predetermined period of time, in near real-time, etc.

In at least one example, the vehicle computing device(s) 604 can include one or more system controller(s) 628, which can be configured to control steering, propulsion, braking, safety, emitters, communication, and other systems of the vehicle 602. These system controller(s) 628 can communicate with and/or control corresponding systems of the drive system(s) 614 and/or other components of the vehicle 602.

The conditional logic 642 may include conditions and/or other information that is used to evaluate and validate the state of the vehicle and/or requests sent between the computing device(s) 632 and the vehicle 602.

In at least one example, the sensor system(s) 606, can include lidar sensors, radar sensors, ToF sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604. In some examples, the sensor system(s) 606 can preprocess at least some of the sensor data prior to sending the sensor data to the vehicle computing device(s) 604. In at least one example, the sensor system(s) 606 can send sensor data, via the network(s) 630, to the computing device(s) 632 at a particular frequency, after a lapse of a predetermined period of time, in near real-time, etc.

The vehicle 602 can also include one or more emitter(s) 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be disposed at various locations about the exterior and/or interior of the vehicle 602.

The vehicle 602 can also include communication connection(s) 610 that enable communication between the vehicle 602 and other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 630. For example, the communications connection(s) 610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 612 can directly connect the drive system(s) 614 and other components of the vehicle 602.

In at least one example, the vehicle 602 can include drive system(s) 614. In some examples, the vehicle 602 can have a single drive system. In at least one example, if the vehicle 602 has multiple drive system(s) 614, drive system(s) 614 can be positioned on opposite ends of the vehicle 602 (e.g., the front and the rear, etc.). In at least one example, the drive system(s) 614 can include sensor system(s) to detect conditions of the drive system(s) 614 and/or the surroundings of the vehicle 602. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 614. Furthermore, the drive system(s) 614 also include communication connection(s) that enable communication by the respective drive module with other local or remote computing device(s).

In some examples, the vehicle computing device(s) 604, sensor system(s) 606, emitter(s) 608, and the communication connection(s) 610 can be implemented outside of an actual vehicle, for instance, as a simulated vehicle or as simulated systems, for use in "traversing" a simulated environment. That is, the vehicle computing device(s) 604, sensor system(s) 606, emitter(s) 608, and the communication connection(s) 610 can be used as a simulated autonomous vehicle for simulation purposes as described above.

As described above, the vehicle 602 can send sensor data to the computing device(s) 632, via the network(s) 630. In some examples, the vehicle 602 can send raw sensor data to the computing device(s) 632. In other examples, the vehicle 602 can send processed sensor data and/or representations of sensor data to the computing device(s) 632 (e.g., data output from the localization system 620, the perception system 622, the prediction system 624, and/or the planning system 626). In some examples, the vehicle 602 can send sensor data to the computing device(s) 632 at a particular frequency, after a lapse of a predetermined period of time, in near real-time, etc.

The computing device(s) 632 can receive the sensor data (raw or processed) from the vehicle 602 and/or one or more data collection devices (which can include other vehicles like vehicle 602), as well as data from one or more third-party sources and/or systems. In at least one example, the computing device(s) 632 can include processor(s) 634 and memory 640 communicatively coupled with the processor(s) 634. In the illustrated example, the memory 640 of the computing device(s) 632 stores a secure communication engine 644 and conditional logic 642 that may be used to evaluate and validate requests sent between the computing device(s) 632 and the vehicle 602.

As described above, simulated environments can be useful for enhancing training, testing, and/or validating systems (e.g., one or more components of an AI stack) onboard an autonomous vehicle, such as vehicle 602. In at least one example, simulated environments can be useful for training data models where training data from real environments is insufficient (e.g., as is the case with rare objects, rare scenarios, etc.). In such examples, a resulting data model can be provisioned to, or accessible by, the vehicle 602, and the vehicle 602 can utilize the data model for classifying objects in real-time (e.g., while driving or otherwise operating in the real environment). That is, the perception system 622 can utilize the data model (trained based on simulated data associated with a simulated environment) onboard in near real-time to classify objects.

Furthermore, simulated environments can be useful for validating and/or updating a localization algorithm used by the localization system 620. For instance, in real environments, GPS sensors experience positional drifts and may, as a result, accumulate error. Accordingly, to validate a localization algorithm that is used for localizing the vehicle 602, the evaluating computing device(s) 632 can use a simulated environment, where the pose of the vehicle 602 is known at various times (including at all times) and evaluate the sensor data associated with a corresponding real environment to validate the localization algorithm (e.g., by relying on simulated poses as position and/or orientation ground truth). In such an example, the sensor system(s) 606 can generate sensor data associated with the simulated environment and the sensor data can be analyzed by the perception system 622. An output of the perception system 622 (e.g., associated with a position in a real environment) can be validated in view of the sensor data associated with the corresponding position in the simulated environment. That is, the sensor data associated with a position in a simulated environment can serve as the ground truth for the corresponding position in the real environment. As an example, lidar data recorded in association with a simulated environment (e.g., where the pose of the vehicle 602 is known) can be compared to lidar data recorded in association with a corresponding position in a real environment and the localization algorithm can be updated as appropriate. Furthermore, simulated environments can be useful for validating radar or other sensors of the sensor system(s) 606. In some examples, simulated environments can offer ground truth data for calibrating sensors (e.g., of the sensor system(s) 606). Other examples include but are not limited to validating rolling shutter in simulation, calibration (e.g., of one or more of intrinsics or extrinsics) of various sensors, and the like. As would be appreciated, the techniques described herein may be used in validation, calibration, training, etc. for various other systems, subsystems, etc.

The processor(s) 616 of the vehicle 602 and the processor(s) 634 of the computing device(s) 632 can be any suitable processor capable of executing instructions to process data and perform operations as described herein. By way of example and not limitation, the processor(s) 616 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, associated circuits (e.g., ASICs, etc.), gate arrays (e.g., FPGAs, etc.), and other hardware devices can also be considered processors in so far as they are configured to implement encoded instructions.

Memory 618 and 640 are examples of non-transitory computer-readable media. Memory 618 and 640 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 632 and/or components of the computing device(s) 632 can be associated with the vehicle 602. That is, the vehicle 602 can perform one or more of the functions associated with the computing device(s) 632, and vice versa.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders and/or steps may be omitted. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the system to perform operations comprising: receiving context data representing a current state of an environment of a vehicle at a current time; receiving object historical data representing a behavior of an object in the environment during a period before the current time; receiving vehicle historical data representing a behavior of the vehicle in the environment during the period before the current time; determining, for a future time, prediction data comprising one or more of a predicted vehicle state or a predicted object state; determining, based at least in part on the context data, the object historical data, the vehicle historical data, and the prediction data, a first data associated with a predicted state of the environment at the future time; receiving teleoperation data associated with a teleoperation command received by the vehicle at the current time, the teleoperation data associated with controlling the vehicle through the environment; determining, based at least in part on the teleoperation data, second data representing the teleoperation data; determining, based at least in part on the first data and the second data, a cost associated with a candidate trajectory; and controlling the vehicle based at least in part on the cost.

B: The system of paragraph A, wherein determining the cost comprises determining a combined embedding by concatenating the first data and the second data.

C: The system of paragraph A or B, wherein: the teleoperation command is associated with at least one of: a vertical position shift of the vehicle, a horizontal position shift of the vehicle, a heading of the vehicle, a velocity of the vehicle, an acceleration of the vehicle, or a yaw rate of the vehicle.

D: The system of any of paragraphs A-C, wherein determining the prediction data comprises: generating a tree structure associated with a plurality of actions for the vehicle to perform; and determining, for a trace of the tree structure, the predicted state of the vehicle.

E: The system of any of paragraphs A-D, wherein the cost is a first cost associated with a first cost category, the operations further comprising: determining, based at least in part on inputting the first data and the second data into a second portion of a machine learned model, a second cost, wherein controlling the vehicle is further based at least in part on the second cost.

F: One or more non-transitory computer-readable media storing instructions executable by one or more processors, wherein the instructions, when executed, cause the one or more processors to perform operations comprising: receiving prediction data representing a predicted state of an environment of a vehicle at a future time; receiving teleoperation data representing a teleoperation command received by the vehicle; determining, based at least in part on the prediction data and the teleoperation data, a cost associated with controlling the vehicle; and controlling the vehicle based at least in part on the cost.

G: The one or more non-transitory computer-readable media of paragraph F, the operations further comprising: determining whether to ignore an impact of the teleoperation command on control of the vehicle; and based at least in part on determining to ignore the impact of the teleoperation command on control of the vehicle, setting the teleoperation data to a default value.

H: The one or more non-transitory computer-readable media of paragraph F or G, wherein: the teleoperation data represents that the vehicle has received the teleoperation command, the teleoperation command comprises a sequence of actions, and determining the teleoperation data comprises: providing the sequence of actions to a machine-learned model, and receiving, from the machine-learned model, the teleoperation data.

I: The one or more non-transitory computer-readable media of paragraph H, wherein the machine-learned model comprises at least one of: a recurrent neural network, or an attention-based transformer.

J: The one or more non-transitory computer-readable media of any of paragraphs F-I, wherein the operations further comprise: receiving context data representing a current state of the environment at a current time; receiving object historical data representing a behavior of an object in the environment during a period before the current time; and receiving vehicle historical data representing a behavior of the vehicle in the environment during the period before the current time; wherein determining the cost is further based at least in part on the context data, the object historical data, and the vehicle historical data.

K: The one or more non-transitory computer-readable media of paragraph J, wherein receiving the context data comprises: receiving a top-down representation of the environment at the current time; providing the top-down representation to a machine-learned model, wherein the machine-learned model comprises a convolutional neural network; and receiving the context data from the machine-learned model.

L: The one or more non-transitory computer-readable media of paragraph J or K, wherein receiving the object historical data comprises: receiving a sequence of actions associated with the object during the period; providing the sequence of actions to a machine-learned model, wherein the machine-learned model comprises a recurrent neural network; and receiving the object historical data from the machine-learned model.

M: The one or more non-transitory computer-readable media of any of paragraphs F-L, wherein the teleoperation command is associated with at least one of: a vertical position shift associated with the vehicle, a horizontal position shift associated with the vehicle, a heading associated with the vehicle, a velocity associated with the vehicle, an acceleration associated with the vehicle, or a yaw rate associated with the vehicle.

N: A method comprising: receiving prediction data representing a predicted state of an environment of a vehicle at a future time; receiving teleoperation data representing a teleoperation command received by the vehicle; determining, based at least in part on the prediction data and the teleoperation data, a cost associated with controlling the vehicle; and controlling the vehicle based at least in part on the cost.

O: The method of paragraph N, further comprising: determining whether to ignore an impact of the teleoperation command on control of the vehicle; and based at least in part on determining to ignore the impact of the teleoperation command on control of the vehicle, setting the teleoperation data to a default value.

P: The method of paragraph N or O, wherein: the teleoperation data represents that the vehicle has received the teleoperation command, the teleoperation command comprises a sequence of actions, and determining the teleoperation data comprises: providing the sequence of actions to a machine-learned model, and receiving, from the machine-learned model, the teleoperation data.

Q: The method of paragraph P, wherein the machine-learned model comprises at least one of: a recurrent neural network, or an attention-based transformer.

R: The method of any of paragraphs N-Q, further comprising: receiving context data representing a current state of the environment at a current time; receiving object historical data representing a behavior of an object in the environment during a period before the current time; and receiving vehicle historical data representing a behavior of the vehicle in the environment during the period before the current time; wherein determining the cost is further based at least in part on the context data, the object historical data, and the vehicle historical data.

S: The method of paragraph R, wherein receiving the context data comprises: receiving a top-down representation of the environment at the current time; providing the top-down representation to a machine-learned model, wherein the machine-learned model comprises a convolutional neural network; and receiving the context data from the machine-learned model.

T: The method of paragraph R or S, wherein receiving the object historical data comprises: receiving a sequence of actions associated with the object during the period; providing the sequence of actions to a machine-learned model, wherein the machine-learned model comprises a recurrent neural network; and receiving the object historical data from the machine-learned model.

The invention claimed is:

1. A system comprising:
one or more processors; and
one or more non-transitory computer-readable media storing computer-executable instructions that, when executed, cause the system to perform operations comprising:

receiving context data representing a current state of an environment of a vehicle at a current time;

receiving object historical data representing a behavior of an object in the environment during a period before the current time;

receiving vehicle historical data representing a behavior of the vehicle in the environment during the period before the current time;

determining, for a future time, prediction data comprising one or more of a predicted vehicle state or a predicted object state;

determining, based at least in part on the context data, the object historical data, the vehicle historical data, and the prediction data, a first data associated with a predicted state of the environment at the future time;

receiving teleoperation data associated with a teleoperation command received by the vehicle at the current time, the teleoperation data associated with controlling the vehicle through the environment;

determining, based at least in part on the teleoperation data, second data comprising an embedding associated with the teleoperation data;

determining, based at least in part on processing the first data and the second data, a cost associated with a candidate trajectory; and controlling the vehicle based at least in part on the cost.

2. The system of claim 1, wherein determining the cost comprises determining a combined embedding by concatenating the first data and the second data.

3. The system of claim 1, wherein:
the teleoperation command is associated with at least one of:
a vertical position shift of the vehicle, a horizontal position shift of the vehicle, a heading of the vehicle, a velocity of the vehicle, an acceleration of the vehicle, or a yaw rate of the vehicle.

4. The system of claim 1, wherein determining the prediction data comprises:
generating a tree structure associated with a plurality of actions for the vehicle to perform; and
determining, for a trace of the tree structure, the predicted state of the vehicle.

5. The system of claim 1, wherein the cost is a first cost associated with a first cost category, the operations further comprising:
determining, based at least in part on inputting the first data and the second data into a second portion of a machine learned model, a second cost, wherein controlling the vehicle is further based at least in part on the second cost.

6. One or more non-transitory computer-readable media storing instructions executable by one or more processors, wherein the instructions, when executed, cause the one or more processors to perform operations comprising:
receiving prediction data representing a predicted state of an environment of a vehicle at a future time;
receiving teleoperation data representing a teleoperation command received by the vehicle;
determining, based at least in part on the teleoperation command, an embedding associated with the teleoperation data;
determining, based at least in part on the prediction data and the embedding, a cost associated with controlling the vehicle; and
controlling the vehicle based at least in part on the cost.

7. The one or more non-transitory computer-readable media of claim 6, the operations further comprising:

determining whether to ignore an impact of the teleoperation command on control of the vehicle; and based at least in part on determining to ignore the impact of the teleoperation command on control of the vehicle, setting the teleoperation data to a default value.

8. The one or more non-transitory computer-readable media of claim 6, wherein:

the teleoperation data represents that the vehicle has received the teleoperation command, the teleoperation command comprises a sequence of actions, and determining the teleoperation data comprises:

providing the sequence of actions to a machine-learned model, and receiving, from the machine-learned model, the teleoperation data.

9. The one or more non-transitory computer-readable media of claim 8, wherein the machine-learned model comprises at least one of:

a recurrent neural network, or an attention-based transformer.

10. The one or more non-transitory computer-readable media of claim 6, wherein the operations further comprise:

receiving context data representing a current state of the environment at a current time;

receiving object historical data representing a behavior of an object in the environment during a period before the current time; and receiving vehicle historical data representing a behavior of the vehicle in the environment during the period before the current time;

wherein determining the cost is further based at least in part on the context data, the object historical data, and the vehicle historical data.

11. The one or more non-transitory computer-readable media of claim 10, wherein receiving the context data comprises:

receiving a top-down representation of the environment at the current time;

providing the top-down representation to a machine-learned model, wherein the machine-learned model comprises a convolutional neural network; and receiving the context data from the machine-learned model.

12. The one or more non-transitory computer-readable media of claim 10, wherein receiving the object historical data comprises:

receiving a sequence of actions associated with the object during the period;

providing the sequence of actions to a machine-learned model, wherein the machine-learned model comprises a recurrent neural network; and receiving the object historical data from the machine-learned model.

13. The one or more non-transitory computer-readable media of claim 6, wherein the teleoperation command is associated with at least one of:

a vertical position shift associated with the vehicle, a horizontal position shift associated with the vehicle, a heading associated with the vehicle, a velocity associated with the vehicle, an acceleration associated with the vehicle, or a yaw rate associated with the vehicle.

14. The one or more non-transitory computer-readable media of claim 6, wherein determining the embedding comprises processing the teleoperation command using a machine-learned model.

15. A method comprising:

receiving prediction data representing a predicted state of an environment of a vehicle at a future time;

receiving teleoperation data representing a teleoperation command received by the vehicle;

determining, based at least in part on the teleoperation command, an embedding associated with the teleoperation data;

determining, based at least in part on the prediction data and the embedding, a cost associated with controlling the vehicle; and controlling the vehicle based at least in part on the cost.

16. The method of claim 15, further comprising:

determining whether to ignore an impact of the teleoperation command on control of the vehicle; and based at least in part on determining to ignore the impact of the teleoperation command on control of the vehicle, setting the teleoperation data to a default value.

17. The method of claim 15, wherein:

the teleoperation data represents that the vehicle has received the teleoperation command, the teleoperation command comprises a sequence of actions, and determining the teleoperation data comprises:

providing the sequence of actions to a machine-learned model, and receiving, from the machine-learned model, the teleoperation data.

18. The method of claim 17, wherein the machine-learned model comprises at least one of:

a recurrent neural network, or an attention-based transformer.

19. The method of claim 15, further comprising:

receiving context data representing a current state of the environment at a current time;

receiving object historical data representing a behavior of an object in the environment during a period before the current time; and receiving vehicle historical data representing a behavior of the vehicle in the environment during the period before the current time;

wherein determining the cost is further based at least in part on the context data, the object historical data, and the vehicle historical data.

20. The method of claim 19, wherein receiving the object historical data comprises:

receiving a sequence of actions associated with the object during the period;

providing the sequence of actions to a machine-learned model, wherein the machine-learned model comprises a recurrent neural network; and receiving the object historical data from the machine-learned model.

* * * * *